(12) United States Patent
Bär

(10) Patent No.: US 9,037,335 B2
(45) Date of Patent: May 19, 2015

(54) METHOD FOR OPERATING AN AUTOMATED GUIDED, MOBILE ASSEMBLY AND/OR MATERIAL TRANSPORT UNIT AND AUTOMATED GUIDED, MOBILE ASSEMBLY AND/OR MATERIAL TRANSPORT UNIT THEREFOR

(76) Inventor: Ralf Bär, Gemmingen (DE)

( * ) Notice: Subject to any disclaimer, the term of this patent is extended or adjusted under 35 U.S.C. 154(b) by 30 days.

(21) Appl. No.: 13/264,316

(22) PCT Filed: Apr. 16, 2010

(86) PCT No.: PCT/DE2010/000430
§ 371 (c)(1),
(2), (4) Date: Oct. 13, 2011

(87) PCT Pub. No.: WO2010/118737
PCT Pub. Date: Oct. 21, 2010

(65) Prior Publication Data
US 2012/0037440 A1 Feb. 16, 2012

(30) Foreign Application Priority Data
Apr. 17, 2009 (DE) .......................... 10 2009 017 556

(51) Int. Cl.
*H02J 7/00* (2006.01)
*G05D 1/00* (2006.01)
(Continued)

(52) U.S. Cl.
CPC ............... *B66F 9/063* (2013.01); *B60L 11/005* (2013.01); *B60L 11/1816* (2013.01);
(Continued)

(58) Field of Classification Search
CPC ............ Y02T 10/70–10/7022; Y02T 10/7088; Y02T 10/7072–10/7094; Y02T 90/00–90/128; B60L 11/1809–11/185; B60L 11/1851–11/1879; B60L 11/005; B60L 11/1837; B60L 2200/40–2200/44; B66F 9/063
USPC ........... 701/23; 320/137, 149, 160, 166–167; 191/4; 307/9.1, 10.1
See application file for complete search history.

(56) References Cited

U.S. PATENT DOCUMENTS 3,986,095 A * 10/1976 Nakai et al. .................... 320/109
RE29,994 E * 5/1979 Bossi ................................ 191/2
(Continued)

FOREIGN PATENT DOCUMENTS

DE 19545544 A 12/1996
DE 102007032776 A 1/2009
(Continued)

OTHER PUBLICATIONS

International Search Report mailed Oct. 4, 2010 for the corresponding PCT application No. PCT/DE2010/000430.
(Continued)

*Primary Examiner* — Fadey Jabr
*Assistant Examiner* — Courtney Heinle
(74) *Attorney, Agent, or Firm* — Leason Ellis LLP.

(57) ABSTRACT

A method for operating a driverless, mobile assembly and/or material transport unit as a driverless transport system (DTS) with fixed assembly and/or warehousing stations. In this method, a system control device is used for the entire assembly process. The driverless, mobile assembly and/or material transport units comprises a travel device for the traveling movement of the unit, a drive device for the travel device, an energy storage device for providing the energy for the drive device and a control device for controlling the traveling movement in coordination with the system control device.

12 Claims, 2 Drawing Sheets

(51) Int. Cl.
    *B66F 9/06*     (2006.01)
    *B60L 11/00*    (2006.01)
    *B60L 11/18*    (2006.01)
    *B60L 15/38*    (2006.01)

(52) U.S. Cl.
    CPC .......... *B60L 11/1837* (2013.01); *B60L 11/185* (2013.01); *B60L 15/38* (2013.01); *B60L 2200/44* (2013.01); *B60L 2260/32* (2013.01); *Y02T 10/7005* (2013.01); *Y02T 10/7022* (2013.01); *Y02T 10/7088* (2013.01); *Y02T 90/121* (2013.01); *Y02T 90/128* (2013.01); *Y02T 90/14* (2013.01)

(56) References Cited

U.S. PATENT DOCUMENTS

| | | | | |
|---|---|---|---|---|
| 5,323,098 | A * | 6/1994 | Hamaguchi et al. | 320/109 |
| 5,710,699 | A * | 1/1998 | King et al. | 363/132 |
| 5,926,004 | A * | 7/1999 | Henze | 320/109 |
| 6,265,851 | B1 | 7/2001 | Brien et al. | |
| 8,027,760 | B2 * | 9/2011 | Chattot | 701/22 |
| 8,378,646 | B2 * | 2/2013 | Shimada et al. | 323/222 |
| 8,384,360 | B2 * | 2/2013 | Cegnar et al. | 320/166 |
| 2002/0156556 | A1 * | 10/2002 | Ruffner | 701/23 |
| 2008/0218104 | A1 | 9/2008 | Lukic et al. | |
| 2008/0277173 | A1 * | 11/2008 | Midrouillet et al. | 180/65.1 |
| 2009/0009131 | A1 * | 1/2009 | Kissel, Jr. | 320/104 |
| 2009/0138149 | A1 * | 5/2009 | Chattot | 701/22 |

FOREIGN PATENT DOCUMENTS

| | | |
|---|---|---|
| EP | 0475106 A1 | 3/1992 |
| EP | 1360090 B | 11/2003 |
| EP | 1864849 A1 | 12/2007 |
| JP | 2006-232102 A | 9/2006 |
| WO | WO-2006/093515 A | 9/2006 |
| WO | WO-2007/134674 A | 11/2007 |

OTHER PUBLICATIONS

Fröhlich et al., "Energy Storage System with UltraCaps on Board of Railway Vehicles", 2007 *European Conference on Power Electronics and Applications*, Sep. 2-5, 2007, Analborg.

Li et al. "Design and Implementation of a Hybrid Energy Supply System for Railway Vehicles", *IEEE*, 2005, pp. 474-480.

* cited by examiner

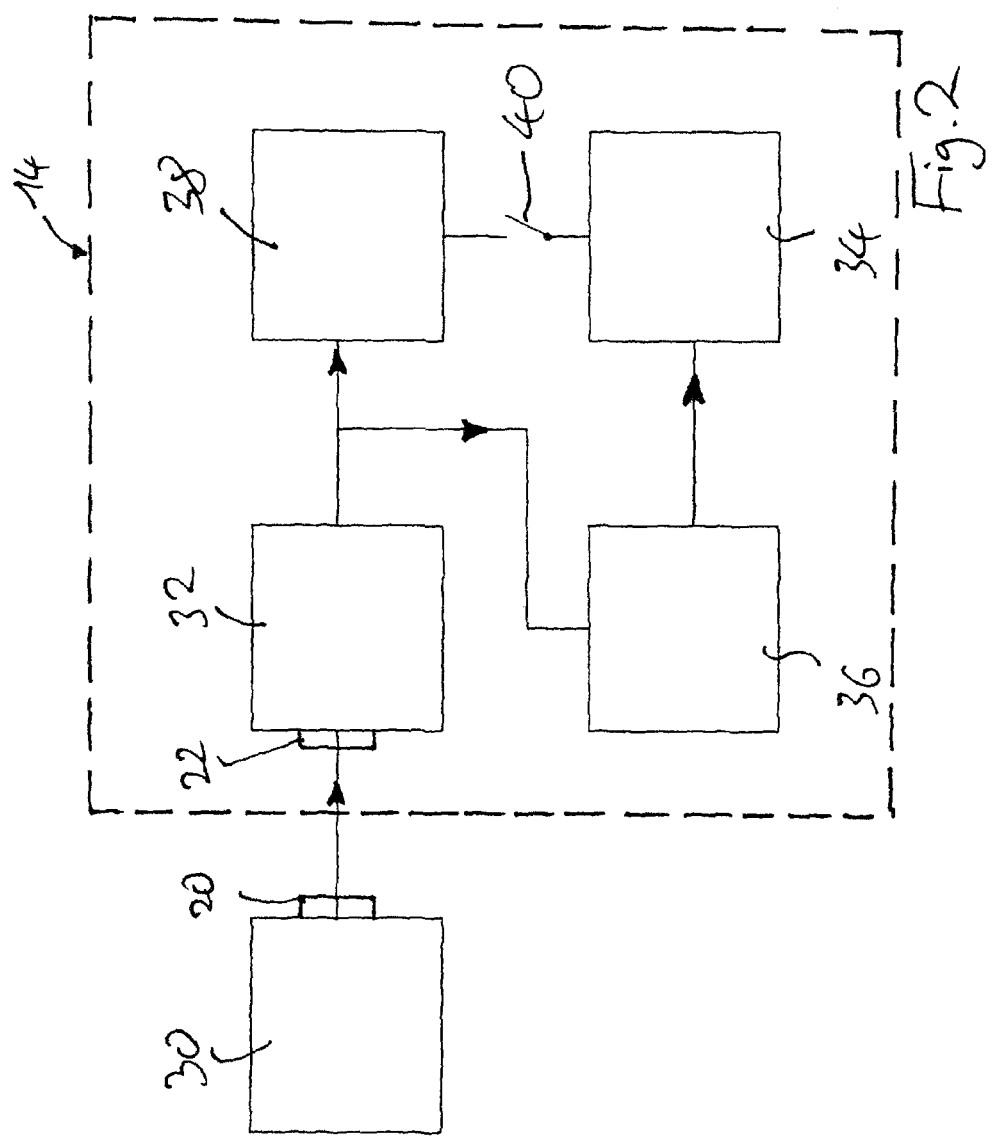

METHOD FOR OPERATING AN AUTOMATED GUIDED, MOBILE ASSEMBLY AND/OR MATERIAL TRANSPORT UNIT AND AUTOMATED GUIDED, MOBILE ASSEMBLY AND/OR MATERIAL TRANSPORT UNIT THEREFOR

CROSS-REFERENCE TO THE RELATED APPLICATION(S)

This application is a U.S. National Phase Application under 35 U.S.C. §371 of International Patent Application No. PCT/DE2010/000430, filed Apr. 16, 2010, and claims the benefit of German Patent Application No. 102009017556.3, filed Apr. 17, 2009, all of which are incorporated by reference herein. The International Application was published in German on Oct. 21, 2010 as International Publication No. WO/2010/118737 under PCT Article 21(2).

FIELD OF THE INVENTION

The present invention relates to a method for operating a driverless, mobile assembly and/or material transport unit as a driverless transport system (DTS) with fixed assembly and/or warehousing stations, wherein a system control device is used for the entire assembly process and the driverless, mobile assembly and/or material transport units have a travel device for the traveling movement of the unit, a drive device for the travel device, an energy storage device for providing the energy for the drive device and a control device for controlling the traveling movement in coordination with the system control device.

Furthermore, the invention relates to a driverless, mobile assembly and/or material transport unit for an assembly facility, in particular for use in a method for operating such a unit, with a travel device for the traveling movement, a drive device for the travel device, a first energy storage device which is in the form of a battery device, and a control device for controlling the traveling movement in coordination with a system control device.

BACKGROUND OF THE INVENTION

In industry, systems are required for driverless, mobile assembly and/or material transport units which can continue to operate 24 hours a day, 7 days a week without being connected to the power supply system. Normally, batteries are used as power supply units. However, these need to be recharged or replaced again and again at appropriate intervals. It is not possible for the industrial trucks to be used during this time.

It is known to use a method for operating an assembly facility with DTS of the type mentioned at the outset, in which the driverless, mobile assembly and/or material transport units have an energy storage device for providing the energy for the drive device, said energy storage device being in the form of a battery. In order to maintain usability over a relatively long period of time, the batteries need to have a high capacity, which necessitates the use of high-volume and heavy batteries. As soon as the state of charge of the batteries becomes critical, the assembly and/or material transport unit needs to be charged at a separate charging station and is no longer available for use purposes for a relatively long period of time.

The demands made by DTS users are therefore becoming greater and greater. A DTS should run 7 days a week, 24 hours a day. The charge times of from 5 to 6 hours for previous battery-operated DTS can no longer be maintained.

Furthermore, induction-guided energy systems have the disadvantage that the floor needs to be cut open, there is a poor energy efficiency and the entire application is very expensive and inflexible.

Electric vehicles are known, in which, in addition to a battery, a double-layer capacitor device, which is also referred to as a supercap or boostcap, is provided. The energy management is configured in this case such that the battery supplies the motor. The supercap is used for discharging the battery, for example when ascending a mountain, in order that an excessively high current does not flow and that the battery does not wear out prematurely. During operation in the generator mode, for example on downhill runs, the supercap is charged.

EP 0 475 106 A1 has described a driverless transport system with a driverless travel unit, wherein the travel unit is guided along a clearly defined travel route. Charging electrodes are provided at certain regions of the travel route, it being possible for said charging electrodes to be brought into contact, tangibly, with electrodes provided on the vehicle, with the result that the vehicle can be driven and, if appropriate, the battery provided on the vehicle can be charged.

US 2008/0277173 A1 discloses a charging system for vehicles, such as buses, for example, in which the vehicles have an energy storage system, which has two components, namely a double-layer capacitor device and a battery. The energy for the drive device of the vehicle is provided by the double-layer capacitors. These double-layer capacitors are charged automatically at certain charging stations. In the event of downhill travel or braking, the energy released thereby (the motor then operates as a generator) is used for charging the double-layer capacitors, wherein, as soon as the double-layer capacitor device is fully charged, this energy is passed on, via said double-layer capacitor device, to the battery in order to charge said battery.

SUMMARY OF THE INVENTION

Against the background of the aforementioned prior art, the present invention is based on the object or the technical problem of specifying a method for operating an assembly facility of the type mentioned at the outset which enables a long use period of the assembly and/or material transport units and which results in a reduction in the volume and weight of the assembly and/or material transport units and enables continuous operation without any problems.

The present invention is furthermore based on the object or the technical problem of specifying a driverless, mobile assembly and/or material transport unit for use in the above-mentioned method which enables a long use time, wherein a compact and light construction is intended to be provided and effective energy management can be used.

The method according to the invention for operating the assembly facility is provided by the features of independent claim 1. Advantageous configurations and developments of the method according to the invention are the subject matter of the claims which are dependent directly or indirectly on independent claim 1.

The method according to the invention is accordingly characterized by the fact that, in addition, a second energy storage device is used which is in the form of a device which can be charged quickly, in particular a double-layer capacitor device, the second energy storage device is charged at a charging station when the unit is at a standstill, the second energy storage device provides the drive energy for the drive device, the second energy storage device furthermore keeps the first energy storage device charged or recharges said first energy storage device and, when the second energy storage device is emptied or when a predetermined voltage value is undershot, the first energy storage device provides the drive energy for the drive device until the second energy storage device is recharged at an assembly or charging station, and the first energy storage device provides the energy for operating a control device and/or a safety device with a scanner, sensors or the like.

The driverless transport vehicle travels as far as a stop within its travel route. It stays for a short period of time for loading and unloading. During this time, it makes contact, via charging contacts, with an external charger, which is provided at the workstation, for example. The double-layer capacitor devices are charged with a high current during this time. With this energy, the transport vehicle can continue to travel for a certain amount of time until it arrives at a new charging station. Owing to the use of double-layer capacitor devices, a novel energy technology for driverless transport systems (DTS) or generally for battery-operated vehicles is possible.

Owing to the use of a double-layer capacitor device as energy store for the drive device of the assembly and/or material transport unit, it is possible to charge said double-layer capacitor device during the residence time at an assembly station, with the result that very high use times are possible.

A particularly preferred configuration of the method according to the invention is characterized by the fact that an additional energy storage device with a high energy density, in particular a battery, is used, which in particular serves to ensure the ease of use of the driverless, mobile assembly and/or material transport unit in the event of relatively long standstill times. The volume and the weight of this battery can be markedly reduced, however, in comparison with the batteries used in the prior art since the energy for normal usage is provided by the double-layer capacitor device.

A particularly preferred development of the method according to the invention is characterized by the fact that the charging contact for charging the energy storage device is produced automatically when the respective position at the assembly station is reached.

The described method involves the concept of combining a double-layer capacitor device with a battery device, i.e. using a double-layer capacitor device for quick charging at a charging station in order to charge the vehicle with maximum energy given a short standstill time (during parking, in the assembly process, etc.). The energy stored in the double-layer capacitor device in the process is sufficient for supplying energy to the drive device of the vehicle from assembly or one charging station to the next charging station and, at the same time, always keeping the battery device charged or charging said battery device. Depending on the capacity of the double-layer capacitor devices and the desired operating range of the mobile assembly and/or material transport unit, only a few charging stations are required.

If an interruption to the running operation occurs (for example factory holidays, traffic congestion, etc.) and the double-layer capacitor device is emptied, the system switches over to the battery operating mode and the mobile, driverless assembly and/or material transport unit is now capable of traveling without the double-layer capacitor device as far as the next charging station, where the double-layer capacitor device can be recharged.

Double-layer capacitor devices have the property that they can withstand approximately 1 million charge cycles until their capacity becomes approximately 20% lower. However, they do have the disadvantage in comparison with a battery device that they do not keep the voltage constant, but follow a discharge curve.

This disadvantage can be circumvented by virtue of a defined current being drawn independently of the voltage, it being possible for said current to be achieved within a certain voltage difference. Alternatively, a battery is fed from the double-layer capacitor device via a broadband DC/DC converter and the energy required for driving the assembly and/or material transport unit is drawn from said battery. This procedure is used in the method according to the invention.

A configuration which is particularly advantageous for practical operation is characterized by the fact that the first energy storage device (battery device) is operated on 27 V (volts) and the second energy storage device (double-layer capacitor device) is operated on 32 V or 48 V (volts).

In order to ensure permanently reliable operation, a particularly advantageous development of the method according to the invention is characterized by the fact that switchover to battery operation takes place as soon as the double-layer capacitor device falls below a voltage value of 20 V (volts).

The driverless, mobile assembly and/or material transport unit according to the invention is provided by the features of independent claim 7.

The driverless, mobile assembly and/or material transport unit according to the invention as a driverless transport system (DTS) for an assembly facility, in particular for use in one of the above-described methods with a travel device for the traveling movement, a drive device for the travel device, a first energy storage device for providing the energy for the drive device, said first energy storage device being in the form of a battery device, and a control device for controlling the traveling movement in coordination with a system control device is characterized by the fact that a second energy storage device is provided which is in the form of a device which can be charged quickly, in particular a double-layer capacitor device, and by the fact that a control device is provided which, when the second energy storage device is charged, controls the provision of the drive energy for the drive device and, at the same time, keeps the first energy storage device in the charged state or recharges said first energy storage device and, when the second energy storage device is emptied or when a predetermined voltage value of the second energy storage device is undershot, activates the first energy storage device for supplying energy to the drive unit until the second energy storage device is recharged, wherein the first energy storage device provides the energy for operating a control device and/or a safety device with a scanner, sensors or the like.

Since, during the use time, the energy for operating the driverless, mobile assembly and/or material transport unit is provided by the double-layer capacitor device, which is charged at the respective assembly station, the battery device can be in the form of a compact and relatively light battery device, as a result of which a compact and light construction of the driverless, mobile assembly and/or material transport unit is possible.

The essence of the present invention is energy management using double-layer capacitors (boostcap) which supply energy directly to the drive device. Until now, boostcaps have been used in order to store recovered braking energy in electric vehicles and to produce high currents during startup of a vehicle for discharging a battery.

The considerable advantage of the boostcaps consists in that they can be charged and discharged almost as often as desired. This is also a considerable advantage in comparison with a battery which is spent after approximately 500 charge cycles. A further advantage is the use of double-layer capacitors owing to the low energy loss during the charging and discharging operations.

Since industrial trucks are used for transport operations which reach their start point again and again, the mentioned boostcaps are even used instead of batteries according to the invention. Boostcaps can be charged with a very high current or else discharged. In the present case according to the invention, the boostcaps are charged with a high current at a station where a loading and unloading operation of component parts for the industrial truck takes place at the same time. The amount of current is sufficient for supplying current to a vehicle, for example for a transport circuit. Some exemplary advantages of the method according to the invention and the transport unit according to the invention are given below:

The method according to the invention provides an energy supply system which enables an electrically driven vehicle to run around the clock. A further advantage can be seen in combination with a charging system which, whenever a vehicle remains stationary at the charging station, emits an energy surge into boostcaps, while the vehicle remains stationary in any case for loading and unloading activities. The charging of the boostcaps takes place either via charging contacts which are embedded in the floor or are fitted on the sides or via contactless, inductive power transmission. In a particularly advantageous manner, the boostcaps are also suitable for generating a constant control voltage for signals and control elements via DC/DC converters. In a further particularly advantageous configuration, the boostcaps are used for backing up the first energy storage device, which can be in the form of an auxiliary battery, via DC/DC converters, wherein the auxiliary battery can supply electrical energy to the signal and control elements of the vehicle.

In the event of an emergency, when the boostcaps are empty or a predetermined voltage value has been undershot, the drive can be supplied by the backup battery until the boostcaps are recharged, which generally takes place in a relatively short time at the next charging station. The drives are preferably in the form of brushless servodrives which operate in a wide voltage range.

The method according to the invention differs from the prior art in that, during normal operation, the drive device is fed directly from the supercap. The additionally used battery is in any case a backup battery for the case of an emergency if the supercap is empty, wherein the backup battery can also be used for supplying voltage to control and signal elements. Such an application with this structure is not known.

Further embodiments and advantages of the invention are provided by the features mentioned in addition in the claims and by the exemplary embodiment specified below. The features of the claims can be combined as desired with one another insofar as they are not obviously mutually exclusive.

BRIEF DESCRIPTION OF THE DRAWING

The invention and advantageous embodiments and developments thereof will be described in more detail and explained below with reference to the example illustrated in the drawing. The features which can be gleaned from the description and the drawing can be used individually or multiply in any desired combination in accordance with the invention. In the drawing:

FIG. 2 is a schematic circuit diagram for the connection between the first and second energy storage device and an external charging station and a drive device of an assembly and/or material transport unit.

DETAILED DESCRIPTION OF THE INVENTION

Figure 1:
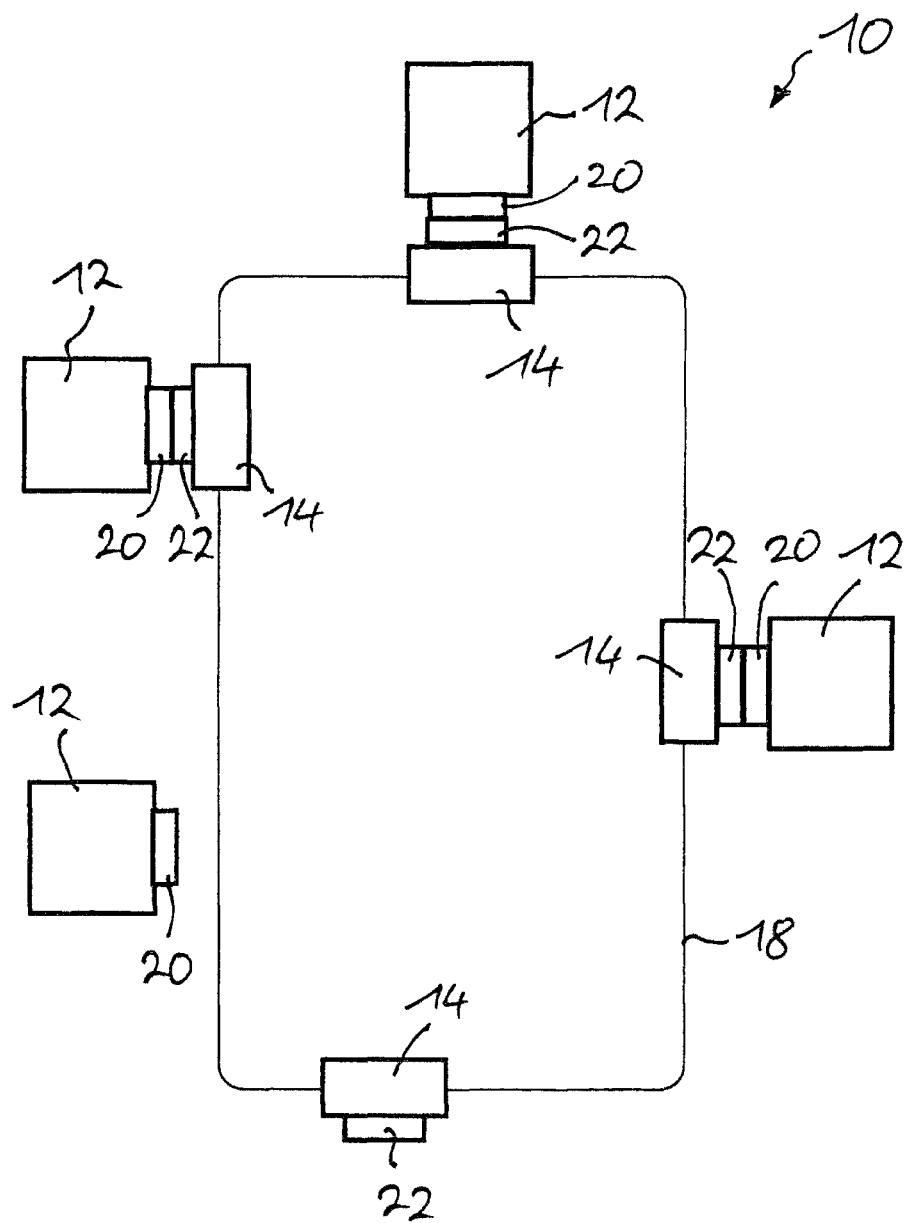
FIG. 1 is a schematic plan view of an illustrated assembly facility with fixed assembly stations and driverless, mobile assembly and/or material transport units which can travel between the assembly stations and which are operated by a first energy storage device (battery) and a second storage device (double-layer capacitor)

In the case of the assembly facility 10 illustrated in FIG. 1, fixed assembly stations 12 are provided which are driven up to by driverless, mobile assembly and/or material transport units 14.

In this case, a coded travel route 18 is provided between the individual assembly stations 12, said travel route being read by means of read units provided on the driverless, mobile assembly and/or material transport units 14 and being converted into a traveling movement via a control device. System control matches the traveling movements of the assembly and/or material transport units 14 to one another.

In addition to a coded travel route 18, it is also possible to perform respective positioning of the assembly and/or material transport units 14 via GPS (Global Positioning System) or optical or inductive control.

A double-layer capacitor device, i.e. an energy storage device which can be charged quickly, is used as the energy storage device for driving the drive device of the driverless, mobile assembly and/or material transport units 14.

Both the driverless, mobile assembly and/or material transport unit 14 and the assembly station 12 have electrical charging contacts 20 and 22, respectively, which automatically produce electrically conductive contact when the assembly and/or material transport unit 14 is positioned correspondingly in front of the respective assembly station 12. For the residence duration of the assembly and/or material transport unit 14 at the respective assembly station 12, charging of the energy storage device of the respective assembly and/or material transport unit 14 is performed via the assembly station 12. As a result, a long use time of the vehicles of the driverless, mobile assembly and/or material transport units 14 is possible.

The fixed assembly stations 12 may be, for example, assembly stations with fully automatic, semiautomatic or manual operation.

FIG. 2 shows a schematic illustration of a circuit diagram for an assembly and/or material transport unit 14 in respect of the supply of energy to a drive device 38. The unit 14 has a second energy storage device 32 which can be charged quickly, in particular a double-layer capacitor device, and a first energy storage device 34, which is in the form of a battery device.

The second energy storage device 32 is connected to the first energy storage device 34 via a DC/DC converter 36. Both the first and the second energy storage devices 34, 32 are in principle capable of supplying drive energy to the drive device 38.

A switching unit 40, which may be in the form of a relay, for example, is provided between the first energy storage device 34 and the drive device 38.

In the state illustrated in FIG. 2, the second energy storage device 32 is electrically conductively connected to an external charging device 30, wherein contact is made via the charging contacts 20 and 22, respectively. This charging station 30 can be provided, for example, at a workstation, which is approached by the unit 14 and, when the approach position is reached, automatically produces an electrical contact between the charging station 30 and the second energy storage device 32.

The concept according to the invention is now based on combining the second energy storage device 32 (double-layer capacitor device) with a first energy storage device 34 (battery device), i.e. using the second energy storage device 32 for quick charging at a charging station 30 in order to charge the unit with maximum energy given a relatively short standstill time (during parking, during the assembly process etc.). This can take place in a relatively short period of time. The energy stored in the process in the second energy storage device is dimensioned so as to supply energy to the drive device 38 of the unit 14 from one charging station as far as to the next charging station and, at the same time, also to always keep the first energy storage device 34 charged or to recharge said first energy storage device. This charging takes place via a DC/DC converter 36.

If an interruption to the running operation occurs (for example factory holidays, traffic congestion, etc.) and the second energy storage device 32 is emptied, the system switches over to the first energy storage device 34 and the unit is now capable of running without the second energy storage device 32 as far as the next charging station, at which the second energy storage device 32 can be recharged.

The temporary use state of the first or the second energy storage device 34, 32 is taken over by a control device (not illustrated in any more detail in FIG. 2), which acts upon a switchover unit 40, which can in particular be in the form of a relay, when a predetermined voltage value of the second energy storage device 32 is undershot, as a result of which the first energy storage device 34 supplies drive energy to the drive device 38.

By virtue of the concept according to the invention of the combination of a double-layer capacitor device with a battery device, permanently reliable operation and permanently reliable functioning of the assembly and/or material transport unit according to the invention is provided. Since to a large extent the double-layer capacitor device normally performs the function of supplying energy to the drive device, the battery device can be kept relatively small in terms of its charge capacity, which complies with a compact design of the assembly and/or material transport unit 14 and results in a considerable weight reduction.

The invention claimed is:

1. A method for operating a driverless, mobile assembly or material transport unit as a driverless transport system (DTS) for an assembly or warehousing facility comprising;
   a travel device for providing traveling movement of the transport unit,
   a drive device for causing movement of the travel device,
   a first energy storage device which is in the form of a battery device,
   a control device for controlling the traveling movement in coordination with a system control device,
   a second energy storage device which is used in the mobile assembly or material transport unit, said second energy storage device being in the form of a device which can be charged quickly, in particular a double-layer capacitor device, and
   a switching unit that is provided between the first energy storage device and the drive device, said method comprising the steps of:
   solely charging the second energy storage device at an assembly or a charging station when the transport unit is at a standstill;
   providing drive energy directly to the drive device from the second energy storage device during normal operation, while said second energy storage device simultaneously keeps the first energy storage device charged or recharged, said first energy storage device providing no drive energy to the drive device during the normal operation;
   switching the system by using the switching unit to provide drive energy from the first energy storage device to the drive device when the second energy storage device is emptied or when a predetermined voltage value is undershot until the second energy storage device is recharged;
   providing energy to the control device or a safety device with a scanner and sensors from the first energy storage device.

2. The method as claimed in claim 1, further comprising the step of:
   automatically connecting a charging contact to the second energy storage device when a respective position at the charging station is reached, said charging contact being used for charging the second energy storage device.

3. The method as claimed in claim 1, further comprising the step of:
   disposing a DC/DC converter between the first and the second energy storage devices.

4. The method as claimed in claim 1, further comprising the steps of:
   operating the second storage device at a voltage of approximately 32 V (volts) or 48 V (volts), and
   operating the first energy storage device at a voltage of approximately 27 V (volts).

5. The method as claimed in claim 1, wherein
   when a voltage of 20 V (volts) at the second energy storage device is undershot, the system is switched over such that the first energy storage device supplies energy to the drive device.

6. The method as claimed in claim 1, wherein
   the first energy storage device is used as a small backup battery.

7. The method as claimed in claim 1, wherein energy is provided to the safety device with a scanner and sensors from the first energy storage device.

8. The method as claimed in claim 1, wherein the switching unit is in a form of a relay.

9. A driverless, mobile assembly or material transport unit as a driverless transport system (DTS) for an assembly facility, comprising:
   a travel device for providing traveling movement of the transport unit;
   a drive device for causing movement of the travel device;
   a first energy storage device which is in the form of a battery device;
   a control device for controlling the traveling movement in coordination with a system control device;
   a second energy storage device that provides energy directly to the drive device during normal operation, said second energy storage device being in the form of a device which can be charged quickly, in particular a double-layer capacitor device, said first energy storage device providing no energy to the drive device during the normal operation; and
   a switching unit that is provided between the first energy storage device and the drive device, wherein,
   when the second energy storage device is solely charged while the transport unit is at a standstill, the control device controls a supply of drive energy for the drive device from the second energy storage device and at the same time keeps the first energy storage device in a charged state, or recharges said first energy storage device via the second energy storage device, when the second energy storage device is emptied or when a predetermined voltage value for the second energy storage device is undershot, the control device activates the first energy storage device by using the switching unit for supplying energy from the first energy storage device to the drive device until the second energy storage device has been recharged, and the first energy storage device provides energy for operating the control device or a safety device with a scanner and sensors.

10. The assembly or material transport unit as claimed in claim 9, wherein
the drive device has at least one brushless servodrive motor.

11. The assembly or material transport unit as claimed in claim 9, wherein the first energy storage device provides energy for operating the safety device with a scanner and sensors.

12. The assembly or material transport unit as claimed in claim 9, wherein the switching unit is in a form of a relay.

* * * * *